US012432832B2

(12) United States Patent
Van Den Berg et al.

(10) Patent No.: US 12,432,832 B2
(45) Date of Patent: Sep. 30, 2025

(54) APPARATUS FOR A LUMINAIRE AND A METHOD OF OPERATING A LUMINAIRE

(71) Applicant: SIGNIFY HOLDING B.V., Eindhoven (NL)

(72) Inventors: Marlon Van Den Berg, Nijmegen (NL); Jan Lansdaal, Eindhoven (NL); Mark Van Moorsel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/499,394

(22) PCT Filed: Mar. 15, 2018

(86) PCT No.: PCT/EP2018/056564
§ 371 (c)(1),
(2) Date: Sep. 30, 2019

(87) PCT Pub. No.: WO2018/177766
PCT Pub. Date: Oct. 4, 2018

(65) Prior Publication Data

US 2021/0105885 A1 Apr. 8, 2021

(30) Foreign Application Priority Data

Mar. 28, 2017 (EP) .................................... 17163297

(51) Int. Cl.
*H05B 47/19* (2020.01)
*H05B 47/11* (2020.01)

(52) U.S. Cl.
CPC ............ *H05B 47/19* (2020.01); *H05B 47/11* (2020.01)

(58) Field of Classification Search
CPC ................................ H05B 47/19; H05B 47/11
See application file for complete search history.

(56) References Cited

U.S. PATENT DOCUMENTS

| | | | | |
|---|---|---|---|---|
| 8,843,642 B2 | 9/2014 | Shen et al. | | |
| 2003/0096576 A1* | 5/2003 | Salonidis | H04W 48/16 | 455/41.1 |
| 2011/0199004 A1 | 8/2011 | Henig et al. | | |
| 2012/0074852 A1* | 3/2012 | Delnoij | H05B 47/19 | 250/214.1 |

(Continued)

FOREIGN PATENT DOCUMENTS

| | | |
|---|---|---|
| CN | 104735870 A | 6/2015 |
| CN | 106304537 A | 1/2017 |

(Continued)

OTHER PUBLICATIONS

Lutron, Using a Green Laser to Program Lutron Ceiling and Wall-Mounted Devices, 2012 (Year: 2012).*

(Continued)

*Primary Examiner* — Raymond R Chai

(57) ABSTRACT

Apparatus for a luminaire (1) includes a wireless communications interface (6) for wirelessly communicating with a control device (10), a light sensor (7) and a controller (5). The controller (5) is arranged to control the wireless communications interface (6) such that upon the light sensor (7) being illuminated, the wireless communications interface (6) is able to wirelessly communicate with a control device (10).

8 Claims, 5 Drawing Sheets

(56) References Cited

U.S. PATENT DOCUMENTS

| | | | | |
|---|---|---|---|---|
| 2013/0051806 | A1* | 2/2013 | Quilici | H05B 47/195<br>398/106 |
| 2014/0147122 | A1 | 5/2014 | Ahmed et al. | |
| 2014/0179228 | A1* | 6/2014 | Maffetone | H04B 7/00<br>455/41.2 |
| 2015/0098706 | A1 | 4/2015 | Narendra et al. | |
| 2015/0141005 | A1 | 5/2015 | Suryavanshi et al. | |
| 2016/0338170 | A1* | 11/2016 | Lebel | H04W 4/80 |
| 2017/0023963 | A1* | 1/2017 | Davis | G05B 15/02 |
| 2017/0038787 | A1 | 2/2017 | Baker et al. | |
| 2017/0153681 | A1* | 6/2017 | Chin | G05F 1/625 |
| 2018/0270876 | A1* | 9/2018 | Ding | H04L 5/0055 |
| 2018/0279451 | A1* | 9/2018 | Baus | H05B 47/115 |
| 2019/0050544 | A1* | 2/2019 | Lei | G06F 21/74 |
| 2019/0215062 | A1 | 7/2019 | Engelen et al. | |

FOREIGN PATENT DOCUMENTS

| | | | |
|---|---|---|---|
| DE | 102008061089 | A1 | 6/2010 |
| JP | H10134965 | A | 5/1998 |
| JP | 2014229362 | A | 12/2014 |
| JP | 2015068558 | A | 4/2015 |
| JP | 2016144025 | A | 8/2016 |
| WO | 2014106786 | A1 | 7/2014 |
| WO | 2016050312 | A1 | 4/2016 |
| WO | 2018146042 | A1 | 8/2018 |

OTHER PUBLICATIONS

Ming Ki Chong et al., “A Survey of User Interaction for Spontaneous Device Association,” ACM Computing Surveys, vol. 47, No. 1, Article 8, Apr. 2014 (40 Pages).

* cited by examiner

APPARATUS FOR A LUMINAIRE AND A METHOD OF OPERATING A LUMINAIRE

CROSS-REFERENCE TO PRIOR APPLICATIONS

This application is the U.S. National Phase application under 35 U.S.C. § 371 of International Application No. PCT/EP2018/056564, filed on Mar. 15, 2018, which claims the benefit of European Patent Application No. 17163297.9, filed on Mar. 28, 2017. These applications are hereby incorporated by reference herein.

TECHNICAL FIELD

The present disclosure relates to apparatus for a luminaire and to a method of operating a luminaire.

BACKGROUND

Luminaires are increasingly "connected", that is, the luminaire can be controlled and/or maintained by a separate control device. The luminaire typically has some controller for controlling operation of the luminaire. It is often necessary to wirelessly connect to the luminaire, for example to commission the luminaire or to update the software running on the controller and/or to obtain usage data and diagnostic data from the luminaire. However, it can be difficult for the control device, or the user of the control device, to identify the specific luminaire to which a wireless connection is to be made, especially in the case that there are many luminaires in a particular location.

SUMMARY

According to a first aspect disclosed herein, there is provided apparatus for a luminaire, the apparatus comprising:

- a wireless communications interface for wirelessly communicating with a control device;
- a light sensor; and
- a controller;
- wherein the controller is arranged to control the wireless communications interface such that upon the light sensor being illuminated, the wireless communications interface is able to wirelessly communicate with a control device.

In examples, this enables users to easily "activate" the luminaire of interest so that a connection between the user's control device and the apparatus of the luminaire can be made. The user simply has to shine a light on (the light sensor of) the luminaire in question. This is detected by the controller of the apparatus which can then control the wireless communications interface so that it is able to wirelessly communicate with a control device of the user. This may be achieved using for example a simple light flash, without for example requiring a code or password or message or signature to be conveyed by the light flash.

In an example, the controller is arranged to control the wireless communications interface such that upon the light sensor being illuminated, the wireless communications interface enters an advertising state during which the wireless communications interface wirelessly transmits one or more advertising messages.

According to a second aspect disclosed herein, there is provided apparatus for a luminaire, the apparatus comprising:

- a wireless communications interface for wirelessly communicating with a control device;
- a light sensor; and
- a controller;
- wherein the controller is arranged to control the wireless communications interface such that upon the light sensor being illuminated, the wireless communications interface enters an advertising state during which the wireless communications interface wirelessly transmits one or more advertising messages.

In this context, advertising messages advertise the presence of the wireless communications interface of the luminaire. Such advertising messages may include the logical address of the wireless communications interface. This allows remote devices (such as a control device) to detect the presence of the luminaire and also the logical address of the wireless communications interface so that a connection between the wireless communications interface and the control device can be made.

In an example, the controller is arranged to control the wireless communications interface to cease transmitting advertising messages upon successful wireless connection with a control device.

In an example, the controller is arranged to control the wireless communications interface to cease transmitting advertising messages if no communication with a control device occurs within a predetermined time of the wireless communications interface entering the advertising state.

In an example, the controller is arranged to switch on the wireless communications interface upon the light sensor being illuminated in the case that the wireless communications interface is off at the time that the light sensor is illuminated. The wireless communications interface may by default be in an off state, to save power. This may be the case where for example the luminaire is not (wirelessly) connected to any other luminaire or a network, etc. via the wireless communications interface. In such a case, the wireless communications interface is first caused to switch on upon the light sensor being illuminated and can then transmit advertising messages.

There may also be provided a luminaire comprising a light source and apparatus as described above.

According to a third aspect disclosed herein, there is provided a method of operating a luminaire, the method comprising:

- detecting illumination of a light sensor; and
- a controller of the luminaire controlling a wireless communications interface of the luminaire upon the light sensor being illuminated such that the wireless communications interface is able to wirelessly communicate with a control device.

In an example, the controller controls the wireless communications interface such that upon the light sensor being illuminated, the wireless communications interface enters an advertising state during which the wireless communications interface wirelessly transmits one or more advertising messages.

According to a fourth aspect disclosed herein, there is provided a method of operating a luminaire, the method comprising:

- detecting illumination of a light sensor of the luminaire; and
- a controller of the luminaire controlling a wireless communications interface of the luminaire upon the light sensor being illuminated such that the wireless communications interface enters an advertising state during which the wireless communications interface wirelessly transmits one or more advertising messages.

In an example, the controller controls the wireless communications interface to cease transmitting advertising messages upon successful wireless connection with a control device.

In an example, the controller controls the wireless communications interface to cease transmitting advertising messages if no communication with a control device occurs within a predetermined time of the wireless communications interface entering the advertising state.

In an example, the controller switches on the wireless communications interface upon the light sensor being illuminated in the case that the wireless communications interface is off at the time that the light sensor is illuminated.

In effect, in some examples and in this respect, the apparatus for the luminaire causes the luminaire to be operating in one of two modes. In a first mode, the wireless communications interface is in an off state, or at least does not communicate with other devices, or at least does not transmit advertising messages. In a second mode, the wireless communications interface is in an on state, or at least does communicate or is capable of communicating with other devices, or at least does transmit advertising messages. The apparatus can be caused to transition from the first mode to the second mode by virtue of the light sensor being illuminated. There may be a threshold related to the illumination of the light sensor before the wireless communications interface is put into the second mode, for example a discovery mode or an advertising state. The threshold may relate for example to the light intensity, the duration of the illumination, the total amount of light received over a period of time, the spectral composition of the light, or any combination thereof.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
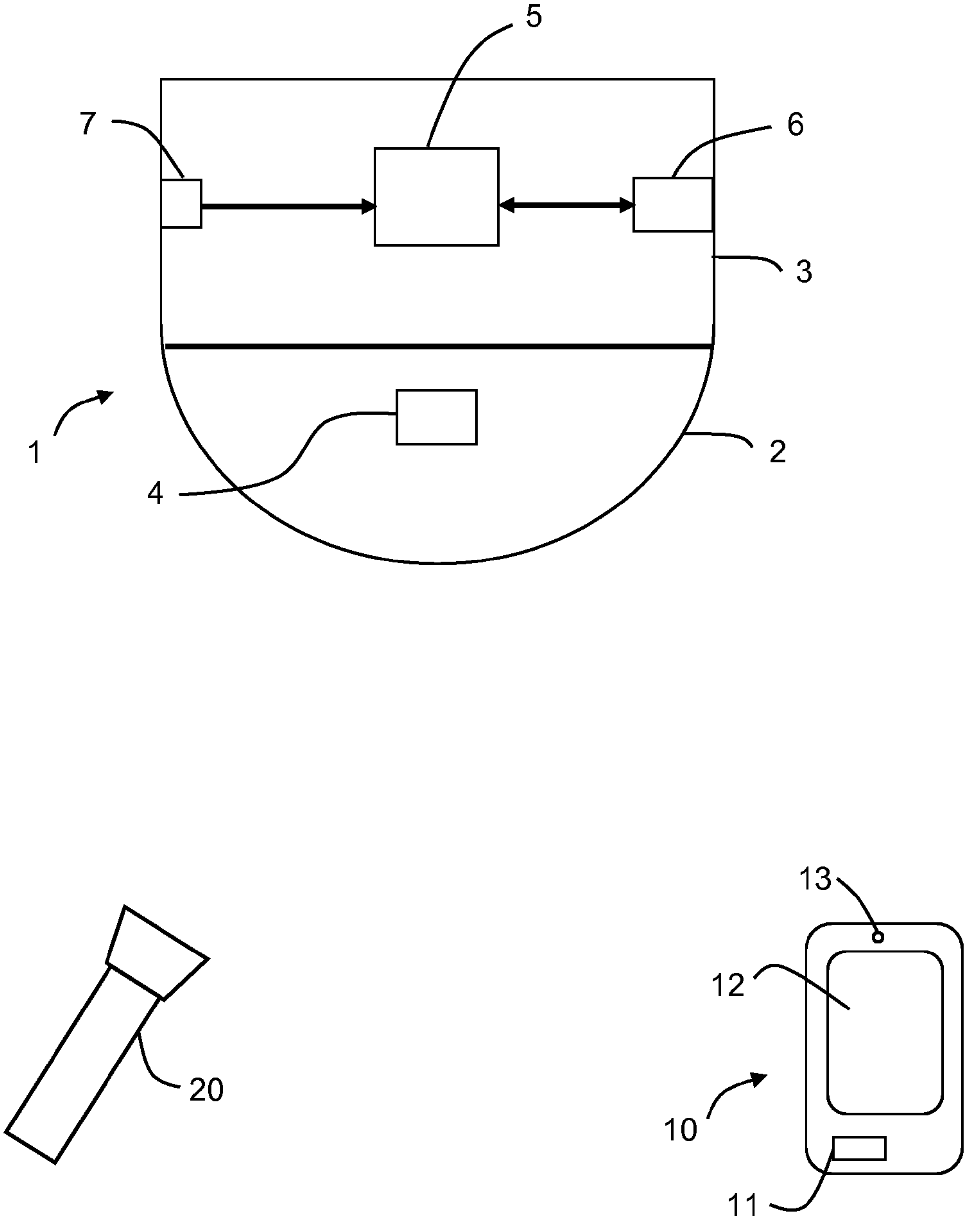
FIG. 1 shows schematically an example of a luminaire and a control device and an optional torch (flashlight)

A luminaire is a device or structure arranged to emit light suitable for illuminating an environment, providing or substantially contributing to the illumination on a scale adequate for that purpose. A luminaire comprises at least one light source or lamp, such as an LED-based lamp, gas-discharge lamp or filament bulb, etc., plus any associated support, casing or other such housing.

As mentioned briefly above, luminaires are increasingly "connected", that is, the luminaire can be controlled and/or maintained by a separate control device. The luminaire typically has some controller for controlling operation of the luminaire and the components of the luminaire. It is often necessary to wirelessly connect to the luminaire, for example to update the software running on the controller and/or to obtain usage data and diagnostic data from the luminaire. However, it can be difficult for the control device, or the user of the control device, to identify the specific luminaire to which a wireless connection is to be made, especially in the case that there are many luminaires in a particular location.

As a specific example, a user may use a control device for updating the luminaire controller and/or obtain usage data and diagnostic data from the luminaire, in which the control device wirelessly connects to the luminaire (or, more precisely, the controller of the luminaire). To be able to do this, the control device must be able to sense the presence of the luminaire and also obtain a logical address from the luminaire so as to be able to set up a paired connection between the control device and the luminaire. To enable this, it is known that the luminaire enters a pairing mode or discovery mode during which it periodically wirelessly broadcasts its presence and logical address and the luminaire is able to accept connections from remote devices. (This may also be referred to as the luminaire being in an "advertising state" in which the luminaire broadcasts "advertising messages".) The advertising message(s) can be received by the user's control device, which then displays on a screen of the control device information concerning the corresponding luminaire. The user can then cause the control device and the luminaire to set up a paired connection.

Now, in the case that there is only one luminaire in a region or location, the user will know that the information displayed on the screen of the control device must correspond to that one luminaire. Similarly, if there is only a small number of luminaires in a region or location, and particularly if they are relatively widely separated from each other, then it can be straightforward for the user to know which luminaire corresponds to the information displayed on the screen of the control device. This might be for example by relying on a signal strength that is displayed for the luminaire, and possibly the user moving around to vary the signal strengths that are received. However, if there are a large number of luminaires and/or the luminaires are located close to each other then it can be very difficult for the user to identify on the control device the particular luminaire of interest. For example, the control device may be displaying information concerning several luminaires for which the signal strength is practically the same as they are all a very similar distance from the control device. Moreover, the control device may even be displaying information concerning luminaires that are not visible to the user. For example, there may be luminaires located in the ceiling of the building floor that is directly below the user: such luminaires would be physically close to the control device and therefore detectable by the control device, and yet the user may not even realize that they exist.

Examples of embodiments of the present invention enable a user to identify or pin-point a specific luminaire to which the user wishes to wirelessly connect using a control device. This reduces or even eliminates the chance that the user connects to and configures or obtains data from the wrong luminaire.

Referring now to FIG. 1, a luminaire 1 has a lamp portion 2 and a controller portion 3. The luminaire 1 may for example be for use in a home or office or public building or the like, or may be for a street light or the like. The lamp portion 2 has at least one light source or lamp 4, such as an LED-based lamp, gas-discharge lamp or filament bulb, etc.

The controller portion 3 has a controller 5 for controlling overall operation of the luminaire 1. As is known per se, the controller 5 may comprise one or more processors. The controller portion 3 further has a wireless communications interface 6 and a light sensor 7 which are in communication with the controller 5. It should be noted that the physical location of the various components is only indicated schematically in FIG. 1. The controller 5, the wireless communications interface 6 and the light sensor 7 are sometime referred to herein collectively as apparatus for the luminaire 1.

The wireless communications interface 6 provides for wireless communication with external devices and, optionally, other luminaires. The wireless communications interface 6 in this example includes the necessary circuitry to provide for wireless communications and an antenna (not shown). The wireless communications interface 6 in particular provides for wireless communication with a control device 10, which will be discussed further below. The wireless communication between the luminaire 1 and the control device 10 is convenient for users, installers, etc., as it means that a physical, wired connection to the luminaire 1 is not necessary. This is useful in many cases, such as when the luminaire 1 is mounted in a relatively inaccessible place (such as in the ceiling of a tall building or tunnel roof, etc., is a street light, etc.). The wireless communication may use a protocol of any suitable type, including for example Bluetooth™, ZigBee™ or Wi-Fi™, with the luminaire 1 and the control device 10 having appropriate corresponding circuitry for the protocol that is used.

The light sensor 7 can in general be any device that senses light, such as for example a photodetector, a photodiode, a photovoltaic cell, a photoresistor or a CMOS sensor, for example. There may be a plurality of light sensors 7 positioned at various locations around the luminaire 1.

The control device 10 may be a portable device having at least a processor and wireless circuitry (shown schematically by the reference numeral 11) for communicating with the luminaire 1. The control device 10 preferably has a screen 12. In addition to the wireless circuitry for communicating with the luminaire 1 as mentioned above, the control device 10 may have cellular communications circuitry for enabling the control device 10 to communicate a via cellular network (such as for example a GSM (Group Special Mobile or 2G (second generation) network, a 3G network, or a 4G or LTE (Long Term Evolution) network, etc.). The control device 10 may be for example a smartphone, a laptop computer, a tablet computer, a personal digital assistant (PDA) or some other mobile computing device.

In one example, the wireless communications interface 6 of the luminaire 1 operates so that by default it does not transmit advertising messages, which advertise the presence of the luminaire 1 and the logical address of the wireless communications interface 6/luminaire 1 for wireless connection purposes. The wireless communications interface 6 may also be set so as not to accept any new connection from a wireless device whilst in this default, passive state. Indeed, if this luminaire 1 does not require use of the wireless communications interface 6 to connect with any other devices (such as other luminaires), then the wireless communications interface 6 may be switched off in order to save power.

In order to be able to wirelessly connect the control device 10 to the luminaire 1, the user first shines a light on the light sensor 7 of the luminaire 1. The source of the light may be for example a light source 13 that is provided on or with the control device 10 (such as a torch or flashlight function built into the control device 10) or may be a separate torch or flashlight 20 or the like. The controller 5 of the luminaire 1 detects saturation of the light sensor 7 or at least detects that a light level that is above the normal environment light level has been received by the light sensor 7. In that case, the controller 5 of the luminaire 1 brings the wireless communications interface 6 into a discovery mode or an advertising state. (The controller 5 of the luminaire 1 first switches on the wireless communications interface 6 if the wireless communications interface 6 was switched off) The controller 5 of the luminaire 1 may cause the advertising state to stay active for a limited, predetermined time after which, if no connection is made to a control device 10, the wireless communications interface 6 may return to the passive state or be switched off as described above. As mentioned, whilst in the advertising state, the wireless communications interface 6 broadcasts advertising messages which broadcasts the presence and logical address of the luminaire 1/wireless communications interface 6.

The user's control device 10 scans for and receives advertising message(s) which are broadcast by the luminaire 1 in question. The control device 10 may be set so as to connect automatically to the luminaire 1 for which the control device 10 has received advertising message(s). Alternatively, the control device 10 may be set so as to indicate to the user details of the luminaire 1 for which the control device 10 has received advertising message(s) (for example, by displaying information concerning the detected luminaire 1 on the display screen 12 of the control device 10). In that case, the user can select the luminaire 1 from the displayed list and the control device 10 can then connect to the luminaire 1. The control device 10 can connect to the luminaire 1/wireless communications interface 6 by using for example a pairing protocol that corresponds to or is determined by the wireless communication protocol that is used for the communications. As mentioned, the wireless communications protocol may be for example Bluetooth™, ZigBee™ or Wi-Fi™, etc.). As a specific example in the case of Bluetooth, the Bluetooth "Just Works" or the Bluetooth "PassKey" pairing protocol can be used depending on the accepted security risk.

After a connection between the luminaire 1 and the control device 10 has been established, as an option the luminaire 1 can give feedback to the user's control device 10 so as to enable the user to confirm that a connection has been made to the intended luminaire 1. Also, as an option, the wireless communications interface 6 of the luminaire 1 may be controlled so as to stop transmitting advertising messages directly after a successful connection with a control device 10 has been established (though the wireless communications interface 6 remains powered on in this case). From this point the user can retrieve data from the luminaire and/or send data and control signals and the like to the luminaire.

Whilst the control device 10 and the luminaire 1 are connected, the user can use the control device 10 to download usage or diagnostic data from the luminaire 1. Alternatively or additionally, the user can use the control device 10 to update the luminaire 1, for example to update the software running on the controller 5 and/or the wireless communications interface 6 of the luminaire 1 or to amend operating characteristics or parameters of the controller 5 and/or the wireless communications interface 6 of the luminaire 1.

After some time the user might decide to disconnect from the luminaire 1. This may be for example because the required usage or diagnostic data has been received at the control device 10 from the luminaire 1 or because the control device 10 has successfully updated the luminaire 1 (e.g. the controller 5 and/or the wireless communications interface 6 of the luminaire 1 has been successfully updated). If the luminaire 1 does not use the wireless communications interface 6 to communicate with any other devices (e.g. another user or another luminaire in the network), then the luminaire's controller 5 might decide to switch off the wireless communications interface 6 to save power.

In this way, the user is easily able to select the luminaire 1 to which the user's control device 10 is to connect, and can do so in advance of attempting to make the connection. The user does not for example have to select the desired luminaire 1 from a list having a large number of luminaires. After the control device 10 and the selected luminaire 1 have been connected (using for example a pairing protocol as discussed above), in general, any type of data can be shared between the control device 10 and the selected luminaire 1, such as for example a network key, programming data, address information, etc. Optionally, the wireless communications interface 6 of the luminaire 1 can be shut down to save power after the control device 6 has disconnected from the luminaire 1.

As mentioned above, in the default, passive state when the wireless communications interface 6 of the luminaire 1 is not connected to a control device 10, then the wireless communications interface 6 may be switched off in order to save power. In that case, the controller 5 of the luminaire 1 first switches on the wireless communications interface 6 once the light sensor 7 has been illuminated and the wireless communications interface 6 then enters the pairing or discovery mode during which it broadcasts advertising messages. As an alternative, the wireless communications interface 6 may already be switched on in this default state, but may only be broadcasting advertising messages to advertise its presence once the light sensor 7 has been triggered by a user shining a light on the light sensor 7. As a further alternative, the wireless communications interface 6 may always be on. In this further alternative; in the case that the light sensor 7 has not been illuminated the wireless communications interface 6 and/or the controller 5 of the luminaire 1 may require a pass code (e.g. a PIN (personal identity number) or password) to be entered, for example via the control device 10, in order to permit the control device 10 to connect to and pair with the luminaire 1, whereas if the light sensor 7 has been illuminated then the wireless communications interface 6 and/or the controller 5 of the luminaire 1 may permit a connection or pairing with any control device 10 that is in range.

It is mentioned above that the controller 5 of the luminaire 1 detects saturation of the light sensor 7 or at least detects that a light level that is above the normal environment light level has been received by the light sensor 7 (and then brings the wireless communications interface 6 into for example a discovery mode or an advertising state). More generally, there may be a threshold related to the illumination of the light sensor 7 before the wireless communications interface 6 is put into for example a discovery mode or an advertising state. The threshold may relate for example to the light intensity, the duration of the illumination, the total amount of light received over a period of time, the spectral composition of the light, or any combination thereof.

Examples of methods of operation of a luminaire 1 will be described with reference to FIGS. 2 to 5.

Figure 2:
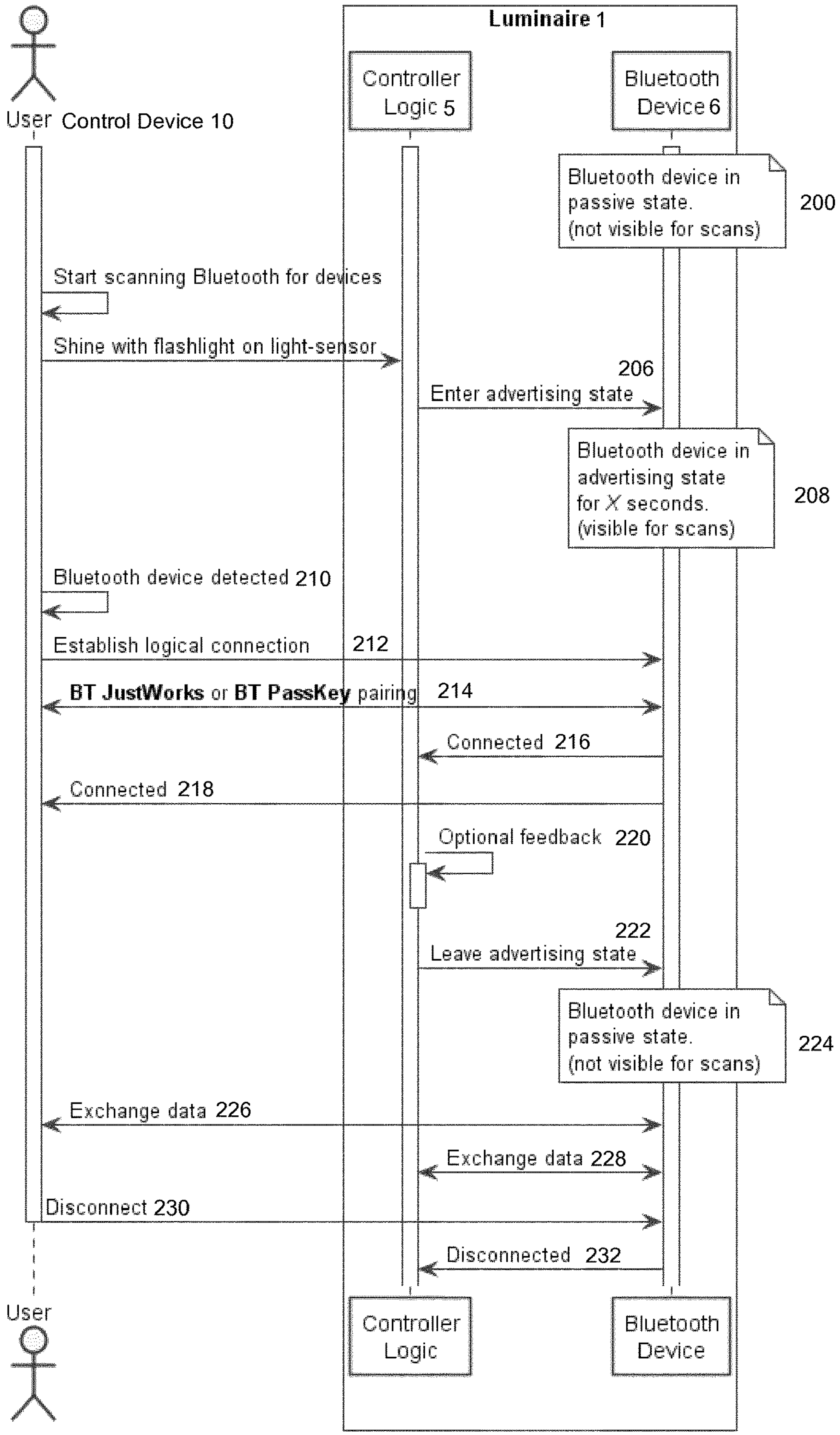
FIG. 2 shows schematically an example of a method of operating a luminaire.

Referring to FIG. 2, initially at 200 the wireless communications interface 6 (such as for example a Bluetooth device) is in some passive state during which it is not visible to scans by another device, such as the user's control device 10. In this example, the wireless communications interface 6 is powered up but is not transmitting discovery or advertising messages. This for example enables the wireless communications interface 6 to communicate wirelessly with other devices.

At 202, the user sets the control device 10 to start scanning for wireless devices. At 204, the user shines a light towards the luminaire 1 to which the user wishes to connect with the control device 10. (The steps 202 and 204 may be carried out in the opposite order.)

Upon illumination of the light sensor 7 of the luminaire 1, at 206 the controller 5 of the luminaire 1 causes the wireless communications interface 6 to enter 208 a discovery or advertising state during which the wireless communications interface 6 advertises the presence of the luminaire 1 by broadcasting advertising messages. The wireless communications interface 6 may be set to remain in the advertising state for a predetermined time after which, if no connection has been made, the wireless communications interface 6 is returned by the controller 5 to the passive state.

At 210, the user's control device 10 detects the wireless communications interface 6 by receiving one or more discovery or advertising messages from the wireless communications interface 6. At 212, the user's control device 10 then initiates a logical, paired connection with the wireless communications interface 6. The paired connection is then achieved by the wireless communications interface 6 and the control device 10 passing keys between each other or by some other suitable process 214. The wireless communications interface 6 informs 216 the controller 5 that it is connected 218 with the control device 10. Optionally, feedback is given 220 to the user's control device 10 so as to enable the user to confirm that a connection has been made to the intended luminaire 1. On learning of the connection with the control device 10, the controller 5 instructs 222 the wireless communications interface 6 to cease transmitting advertising or other discovery messages. The wireless communications interface 6 may for example be put into a passive state 224 during which it is not visible to scans by another device, though here, it is able to communicate with the connected control device 10.

The luminaire 1 and the control device 10 can then exchange data 226 via the wireless communications interface 6 as desired and, optionally, determined by the user. As part of this, the controller 5 of the luminaire 1 and the wireless communications interface 6 may also exchange data 228.

At 230, the user disconnects the control device 10 from the wireless communications interface 6 of the luminaire 1. The wireless communications interface 6 informs the controller 5 of the disconnection at 232.

Figure 3:
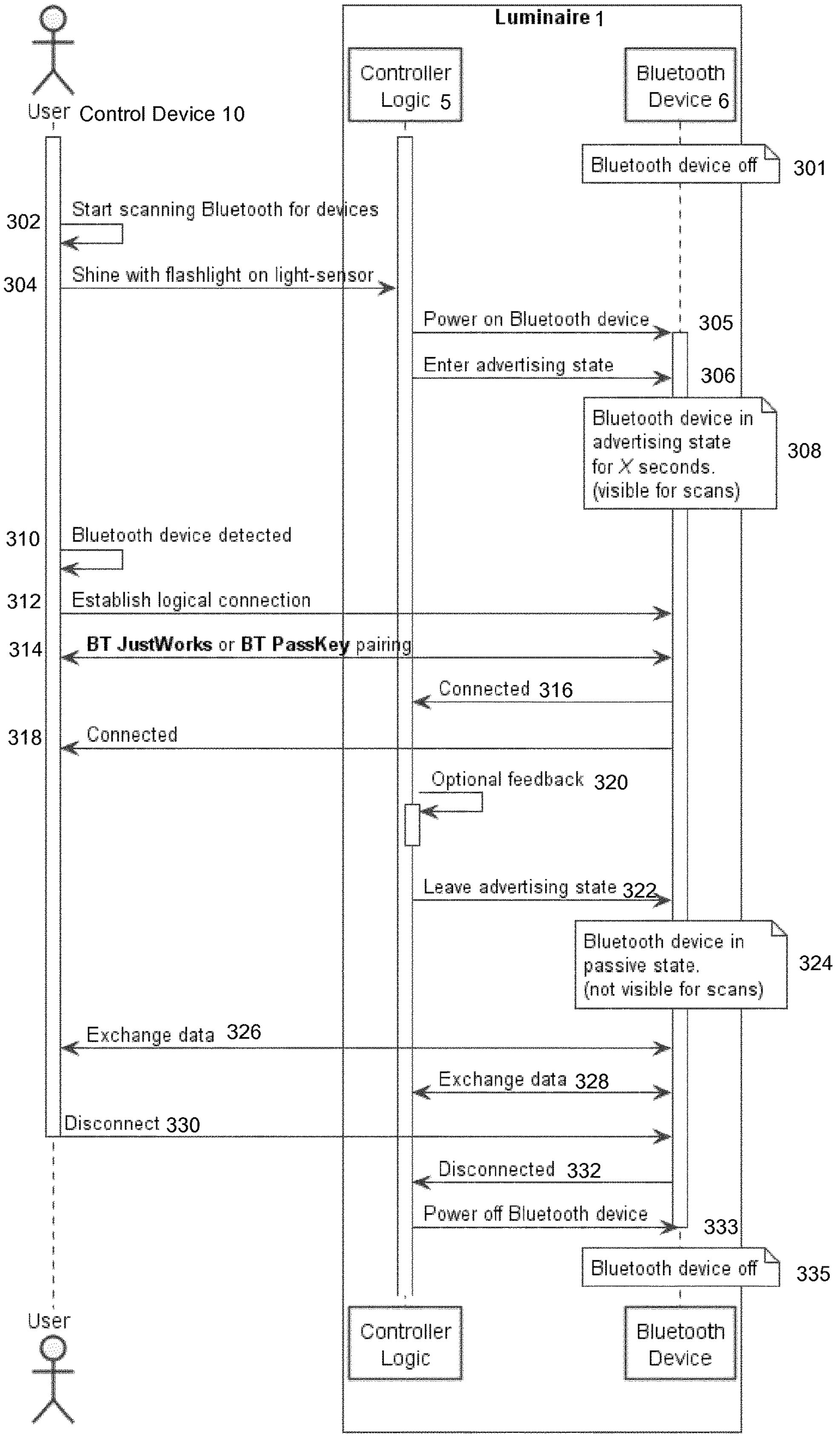
FIG. 3 shows schematically another example of a method of operating a luminaire.

FIG. 3 shows schematically the steps of a variation of the example described above with reference to FIG. 2. The steps that are the same or similar to those described above with reference to FIG. 2 have the same reference numeral but increased by 100 and will not be described in detail further here for brevity.

In this example, initially at 301, the wireless communications interface 6 is switched off. This is an available option when for example the wireless communications interface 6 is not communicating with any other wireless devices. Compared to the example of FIG. 2, once the controller 5 detects that the light sensor 7 has been illuminated, then the controller 5 powers on 305 the wireless communications interface 6. Then, at 306 the controller 5 of the luminaire 1 causes the wireless communications interface 6 to enter 308 a discovery or advertising state during which the wireless communications interface 6 advertises the presence of the luminaire 1 by broadcasting advertising messages. The immediate subsequent steps, including for example the pairing and exchange of data between the control device 10 and the wireless communications interface 6, may be the same or similar to those described above with reference to FIG. 2.

After the wireless communications interface 6 informs the controller 5 of the disconnection from the control device 10 at 332, the controller 5 in this example sends 333 a control signal to the wireless communications interface 6 to power off 335 the wireless communications interface 6. This minimizes power consumption by the luminaire 1.

Figure 4:
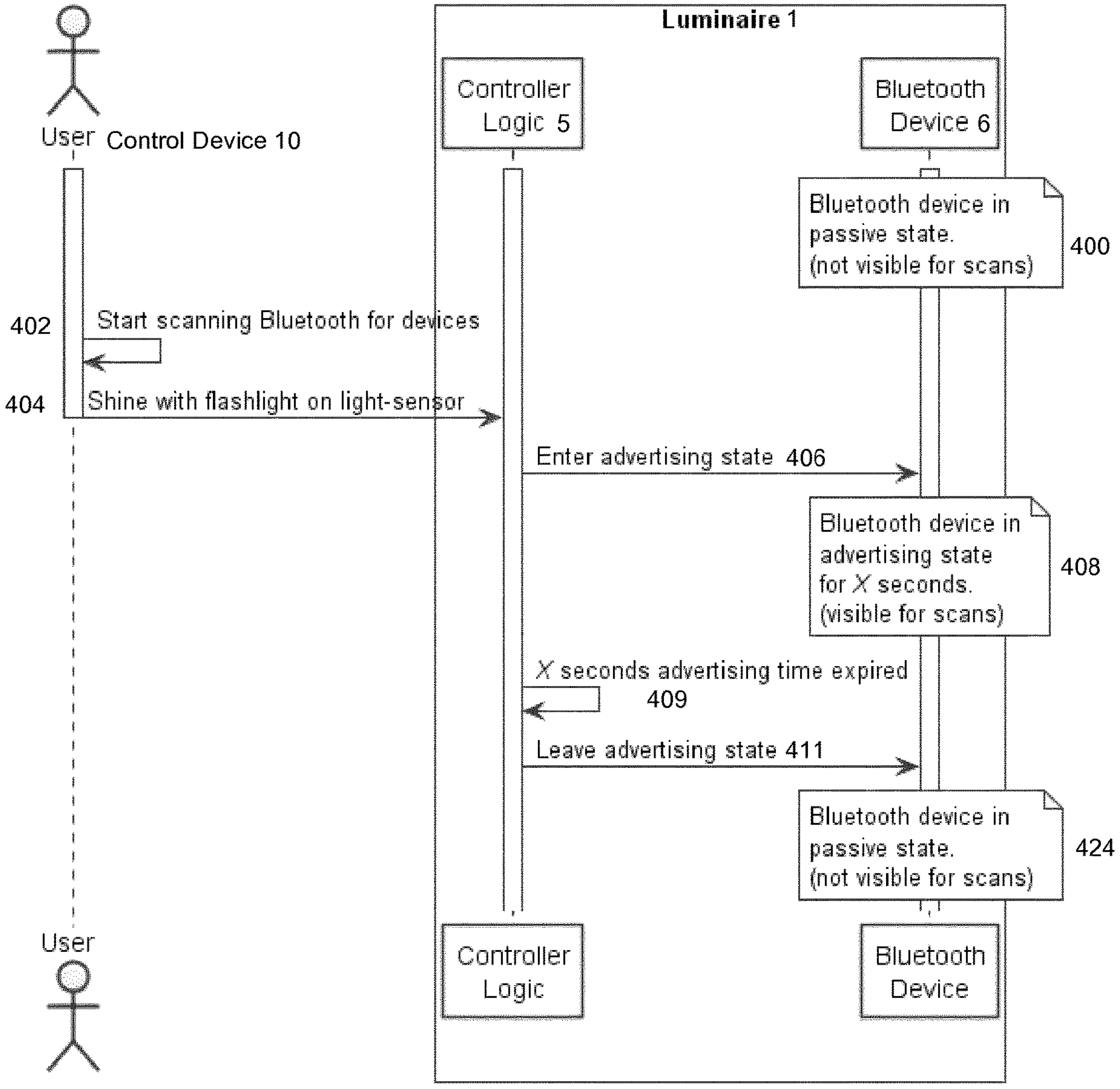
FIG. 4 shows schematically another example of a method of operating a luminaire.

FIG. 4 shows schematically an example of a method during which no connection to a control device is successfully made. The steps that are the same or similar to those described above with reference to FIG. 2 have the same reference numeral but increased by 200 and will not be described in detail further here for brevity.

At 408, the wireless communications interface 6 of the luminaire has been caused 406 to enter a discovery or advertising state during which the wireless communications interface 6 advertises the presence of the luminaire 1 by broadcasting advertising messages. The wireless communications interface 6 in this example has been set to remain in the advertising state for a predetermined time, of X seconds. In this example, after the predetermined time of X seconds has expired, no connection to a control device 10 has been made. This is noted 409 by the controller 5, which as a consequence instructs 411 the wireless communications interface 6 to return to the passive state 424 during which the wireless communications interface 6 is not visible to scans by other devices.

Figure 5:
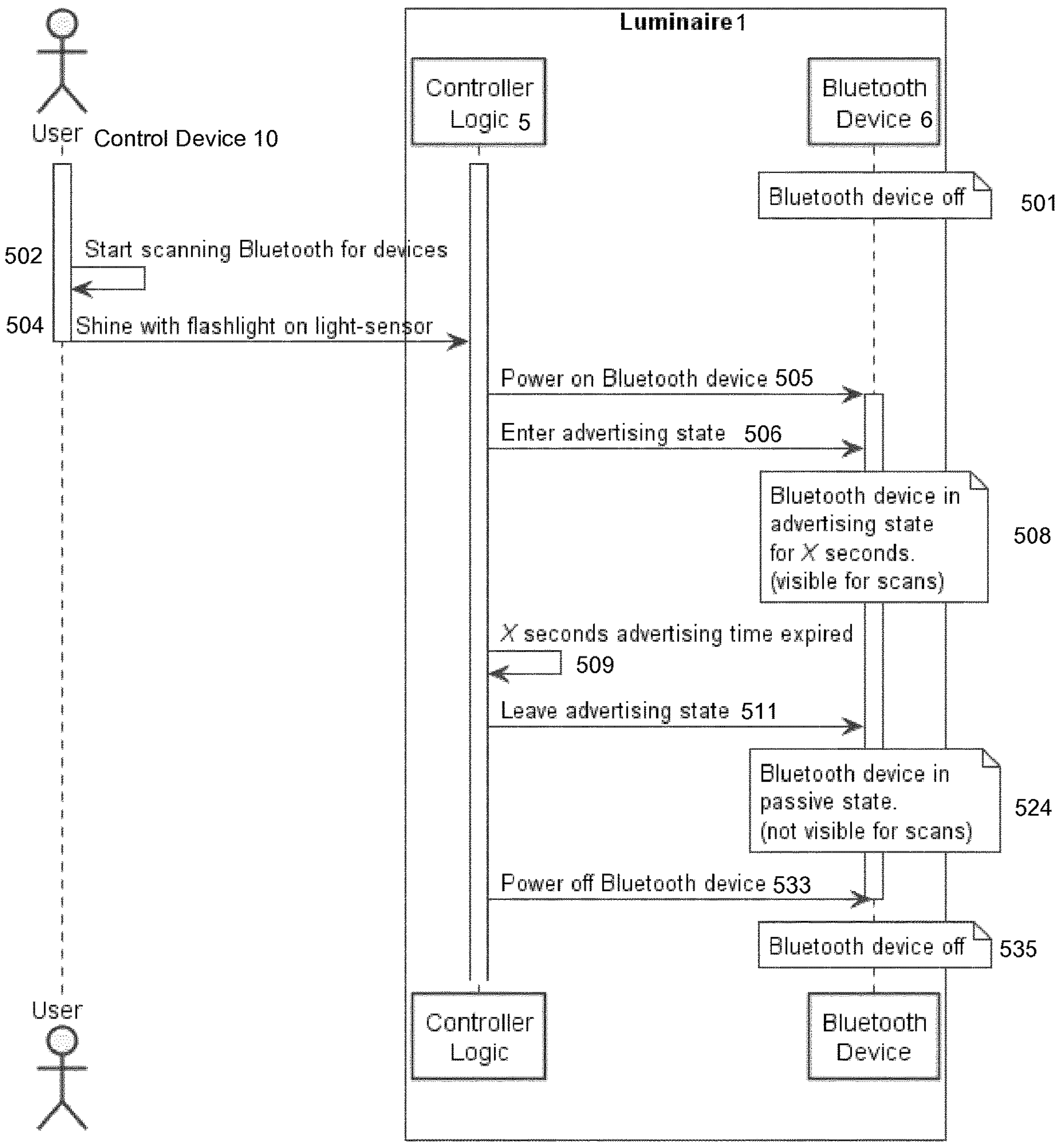
FIG. 5 shows schematically another example of a method of operating a luminaire.

FIG. 5 shows schematically the steps of a variation of the example described above with reference to FIG. 4. The steps that are the same or similar to those described above with reference to FIG. 4 have the same reference numeral but increased by 100 and will not be described in detail further here for brevity.

In this example, initially at 501, the wireless communications interface 6 is switched off. Again, this is an available option when for example the wireless communications interface 6 is not communicating with any other wireless devices. Compared to the example of FIG. 4, once the controller 5 detects that the light sensor 7 has been illuminated, then the controller 5 powers on 505 the wireless communications interface 6. Then, at 506 the controller 5 of the luminaire 1 causes the wireless communications interface 6 to enter 508 a discovery or advertising state during which the wireless communications interface 6 advertises the presence of the luminaire 1 by broadcasting advertising messages.

In this example, after the predetermined time of X seconds has expired, no connection to a control device 10 has been made, and the controller 5 instructs 511 the wireless communications interface 6 to return to the passive state 524 during which the wireless communications interface 6 is not visible to scans by other devices. In this example, the controller 5 also sends 533 a control signal to the wireless communications interface 6 to power off 535 the wireless communications interface 6. This minimizes power consumption by the luminaire 1.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Apparatus for a luminaire, the apparatus comprising:

a wireless communications interface for wirelessly communicating with a control device;

a light sensor configured to detect a light source separate from the control device; and a controller;

wherein upon detection of illumination by the light sensor, the wireless communications interface is turned from an off state to an on state, wherein the controller can control the wireless communication interface to switch between a first mode and a second mode, and in the first mode, the wireless communications interface does not transmit advertising messages, and in the second mode, the wireless communications interface enters an advertising state during which the wireless communications interface wirelessly transmits one or more advertising messages;

wherein the controller is configured to control the wireless communications interface such that upon the light sensor being illuminated above a threshold, the wireless communications interface changes from the first mode to the second mode, and the threshold is defined by at least a duration of the illumination;

wherein when the light sensor has not been illuminated above a threshold, the controller is configured to switch the wireless communications interface from the first mode into the second mode upon receipt of a passcode; and wherein the controller is configured to establish a paired wireless connection with the control device based on the advertising messages, the paired wireless connection including direct bi-directional communications between the controller and the control device.

2. The apparatus according to claim 1, wherein the controller is further arranged to control the wireless communications interface to cease transmitting advertising messages upon a successful paired wireless connection with the control device.

3. Apparatus The apparatus according to claim 1, wherein the controller is arranged to switch on the wireless communications interface upon the light sensor being illuminated when the wireless communications interface is off at the time that the light sensor is illuminated.

4. A luminaire comprising a light source and apparatus according to claim 1.

5. The apparatus of claim 1 wherein the paired wireless connection includes sending and/or receiving data related to updating the controller.

6. The apparatus of claim 1, wherein the control device includes a light source configured to emit light onto the light sensor.

7. The apparatus of claim 1, wherein the wireless communications interface is configured to turn from an off state to an on state upon detection by the light sensor of illumination that is above a light level of a surrounding environment.

8. The apparatus according to claim 1, wherein the controller is arranged to control the wireless communications interface to cease transmitting advertising messages when no communication with the control device occurs within a predetermined time of the wireless communications interface entering the advertising state such that the wireless communications interface enters into a passive state during which the wireless communications interface is not visible to scans and is only able to communicate with the control device.

* * * * *